United States Patent

Usui

[11] Patent Number: 6,030,672
[45] Date of Patent: Feb. 29, 2000

[54] CORROSION- AND CHIPPING-RESISTANT RESIN COATING STRUCTURE FOR STAINLESS STEEL PIPES

[75] Inventor: Masayoshi Usui, Numazu, Japan

[73] Assignee: Usui Kokusai Sangyo Kaisha Limited, Shizuoka Prefecture, Japan

[21] Appl. No.: 09/221,579

[22] Filed: Dec. 22, 1998

Related U.S. Application Data

[62] Division of application No. 08/636,870, Apr. 22, 1996, Pat. No. 5,932,306.

[30] Foreign Application Priority Data

Apr. 24, 1995 [JP] Japan ................................ 7-123245

[51] Int. Cl.$^7$ .................................................. F16L 9/147
[52] U.S. Cl. .................... 428/35.8; 428/35.9; 428/36.91; 428/458; 428/461; 428/474.7; 428/474.9; 428/476.1; 428/476.9; 138/141; 138/146
[58] Field of Search .............................. 428/36.9, 36.91, 428/458, 461, 36.8, 35.8, 35.9, 474.7, 474.9, 476.1, 476.9; 138/140, 141, 145, 146

[56] References Cited

U.S. PATENT DOCUMENTS

| | | | |
|---|---|---|---|
| 4,606,953 | 8/1986 | Suzuki et al. | 428/461 |
| 5,520,223 | 5/1996 | Iorio et al. | 138/141 |
| 5,932,306 | 8/1999 | Usui | 428/35.9 |

*Primary Examiner*—Rena L. Dye
*Attorney, Agent, or Firm*—Nikaido Marmelstein Murray & Oram, LLP.

[57] ABSTRACT

The present invention provides a corrosion- and chipping-resistant resin coating structure for stainless steel pipes with a small diameter and thin wall. The coating structure comprises a stainless steel pipe (1) and a polyolefin or polyamide layer (4) formed on the outer surface thereof. In a preferred embodiment, the coating structure further comprises adhesive layer (2), a fluoroplastic layer (3), and a polyamide adhesive layer (5). The coating structure exhibits good resistance to corrosion with mud and chipping by splashed pebbles.

11 Claims, 3 Drawing Sheets

CORROSION- AND CHIPPING-RESISTANT RESIN COATING STRUCTURE FOR STAINLESS STEEL PIPES

This application is a divisional of application Ser. No. 08/636,870, now U.S. Pat. No. 5,932,306, filed Apr. 22, 1996.

BACKGROUND OF THE INVENTION

1. Field of the Invention

The present invention relates to a corrosion- and chipping-resistant resin coating structure for stainless steel pipes as the passageway for fluid (such as gas and liquid), especially automotive fuel and brake oil. Such stainless steel pipes are mounted under the automobile floor and are subject to corrosion by mud and chipping by splashed pebbles. The present invention is designed to completely protect them from corrosion and chipping.

2. Description of the Prior Art

Metal pipes for the fuel and brake systems are mounted under the automobile floor and are subject to corrosion and chipping by pebbles splashed by tires. Common practice for their protection has been resin coating formed in the following way. For example, a steel pipe (with an optional surface copper layer) is coated with a zinc plating layer and chromate film and then covered with a heat-shrinkable tube of polyvinyl chloride resin or polyolefin resin. Alternatively, the zinc plating layer and chromate film are covered with an intermediate layer of fluoroplastic and an adhesive layer of polyamide resin (particularly nylon 12) on which is slipped a heat-shrinkable tube of polyvinyl chloride resin, polyolefin resin, or fluoroplastic, or on which a gelled lining film is formed from polyvinyl chloride resin. (See Japanese Patent Application Nos. 212255/1988 and 26391/1990.)

A disadvantage of the conventional coating structure mentioned above is that it requires that the ends of the metal pipe be stripped off the heat-shrinkable plastic tube so as to facilitate the insertion of flared fitting and hence the exposed ends are subject to corrosion and chipping. In the case where lining film is formed instead of covering with a heat-shrinkable film, it is necessary to preliminarily mask the ends of the metal pipe.

SUMMARY OF THE INVENTION

It is an object of the present invention to provide a corrosion- and chipping-resistant resin coating structure for stainless steel pipes with a small diameter and thin wall. The resin-coating structure is suitable for fluid piping, especially piping for the automotive fuel and braking system which is mounted under the automobile floor and is subject to corrosion with mud and chipping by splashed pebbles.

In order to eliminate the above-mentioned disadvantage and to achieve the above-mentioned object, the present inventors carried out a series of researches which led to the finding that the object is achieved by forming a resin layer directly on a stainless steel pipe, thereby ensuring adhesiveness.

The first aspect of the present invention resides in a corrosion- and chipping-resistant resin coating structure for stainless steel pipes, said structure comprising a polyolefin or polyamide resin layer formed on the outer surface of a stainless steel pipe.

The second aspect of the present invention resides in a corrosion- and chipping-resistant resin coating structure for stainless steel pipes, said structure comprising an underlying adhesive layer of epoxy resin and a polyolefin or polyamide resin layer formed on top of the other on the outer surface of a stainless steel pipe.

The third aspect of the present invention resides in a corrosion- and chipping-resistant resin coating structure for stainless steel pipes, said structure comprising an underlying adhesive layer of polyamide resin and a polyolefin or polyamide resin layer formed on top of the other on the outer surface of a stainless steel pipe.

The fourth aspect of the present invention resides in a corrosion- and chipping-resistant resin coating structure for stainless steel pipes, said structure comprising an underlying adhesive layer of epoxy resin, an intermediate layer of fluoroplastic, and a polyolefin or polyamide resin layer formed consecutively on the outer surface of a stainless steel pipe.

The fifth aspect of the present invention resides in a corrosion- and chipping-resistant resin coating structure for stainless steel pipes, said structure comprising an underlying adhesive layer of epoxy resin, an intermediate layer of fluoroplastic, an adhesive layer of polyamide resin, and a polyolefin or polyamide resin layer formed consecutively on the outer surface of a stainless steel pipe.

DETAILED DESCRIPTION OF THE INVENTION

The present invention is applicable to stainless steel pipes of any type, such as seamless pipe, semi-seamless pipe, electric-welded pipe, and spirally welded or braized pipe formed from a copper- (or copper alloy-) plated stainless steel sheet. The stainless steel pipes are not specifically limited in wall thickness. The present invention will produce its effect even when it is applied to thin-walled stainless steel pipes.

The polyamide resin includes, for example, nylon 6, nylon 11, and nylon 12. The polyolefin resin includes, for example, polyethylene, polypropylene, and EVA. It may be applied to a stainless steel pipe by extrusion, spraying, dipping, brushing, or the like. The thickness of its coating layer should preferably be in the range of 600 to 1200 μm. A coating layer thinner than specified above does not have sufficient chipping resistance. A coating layer thicker than specified above is obstructive to pipe mounting.

The epoxy resin includes, for example, those of bisphenol type, dihydroxyphenol type, and novolak type. It may be applied to a stainless steel pipe by extrusion, spraying, dipping, brushing, or the like. The thickness of its coating layer should preferably be in the range of 3 to 10 μm. A coating layer thinner than specified above does not produce sufficient adhesion strength. A coating layer thicker than specified above is liable to cracking. The polyamide resin for the adhesive layer is any one of nylon 6, nylon 11, nylon 12, and the like which has a low melting point and a high bond strength. It may be applied to a stainless steel pipe by extrusion, spraying, dipping, brushing, or the like. The thickness of its coating layer should preferably be in the range of 10 to 300 μm. A coating layer thinner than specified above does not provide sufficient adhesion strength. A coating layer thicker than specified above does not produce adhesion strength in proportion to its thickness.

The fluoroplastic includes, for example, polyvinyl fluoride (PVF) and polyvinylidene fluoride (PVDF). It may be applied to a stainless steel pipe by dipping in the form of solvent solution. The thickness of its coating layer should preferably be in the range of 10 to 40 μm. A coating layer thinner than specified above does not provide sufficient adhesion strength. A coating layer thicker than specified above is liable to cracking during pipe bending and cracking hinders adhesion.

According to the coating structure of the present inventions a stainless steel pipe is coated directly or indirectly with a polyamide or polyolefin resin layer which firmly adheres to the pipe and protects the pipe from splashed pebbles. In another embodiment, an intermediate layer of flexible fluoroplastic is interposed between the pipe and the resin coating layer so as to improve adhesion between the pipe and the coating layer and to improve protection from splashed pebbles by increased shock absorption.

EXAMPLES

Figure 1:
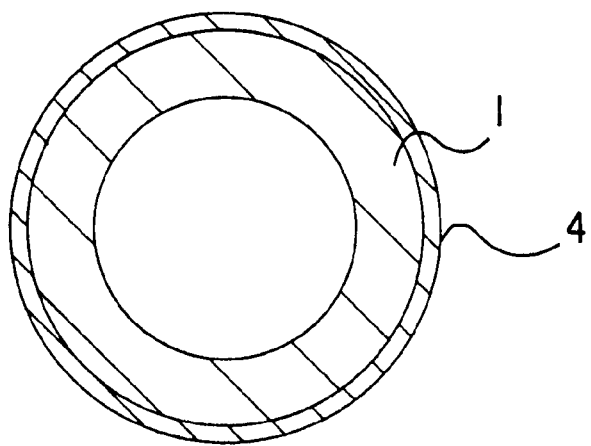
FIG. 1 is a cross-sectional view of a steel pipe with corrosion- and chipping-resistant resin coating structure pertaining to Example 1.
Figure 2:
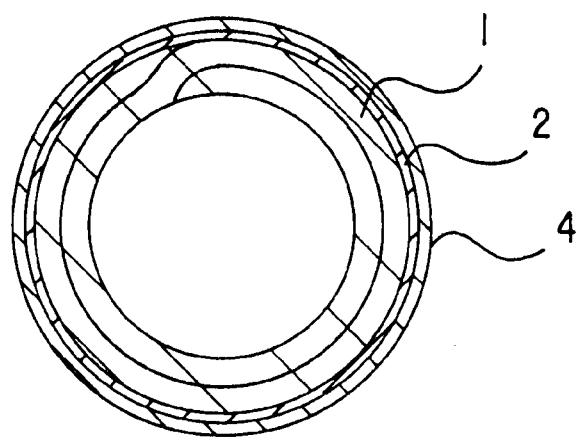
FIG. 2 is a cross-sectional view of a steel pipe with corrosion- and chipping-resistant resin coating structure pertaining to Example 2.
Figure 3:
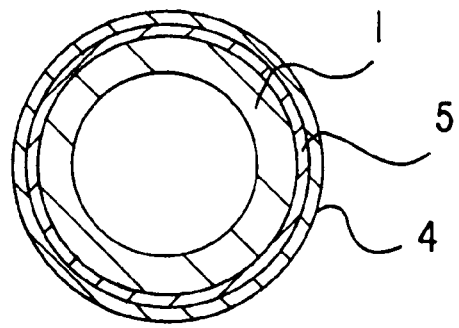
FIG. 3 is a cross-sectional view of a steel pipe with corrosion- and chipping-resistant resin coating structure pertaining to Example 3.
Figure 4:
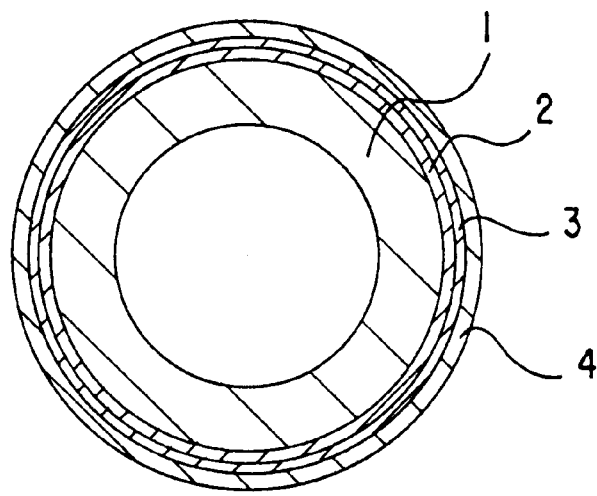
FIG. 4 is a cross-sectional view of a steel pipe with corrosion- and chipping-resistant resin coating structure pertaining to Example 4.
Figure 5:
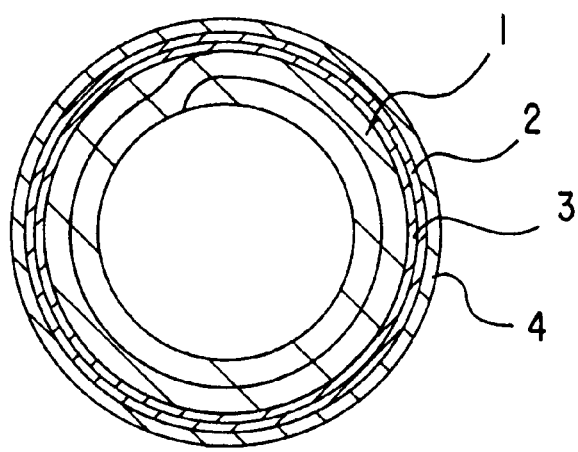
FIG. 5 is a cross-sectional view of a steel pipe with corrosion- and chipping-resistant resin coating structure pertaining to Example 5.
Figure 6:
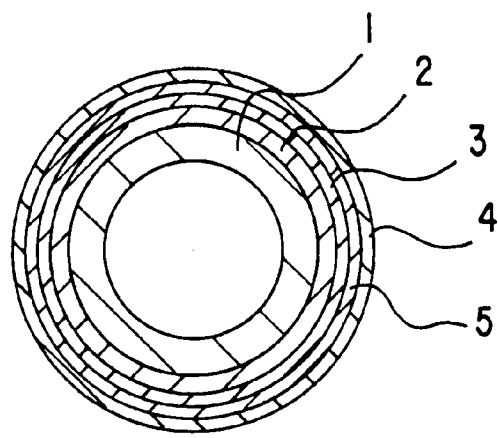
FIG. 6 is a cross-sectional view of a steel pipe with corrosion- and chipping-resistant resin coating structure pertaining to Example 6.
Figure 7:
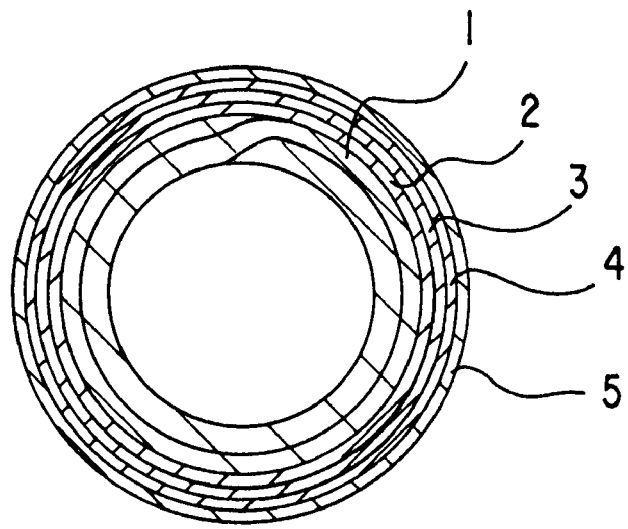
FIG. 7 is a cross-sectional view of a steel pipe with corrosion- and chipping-resistant resin coating structure pertaining to Example 7.
Figure 8:
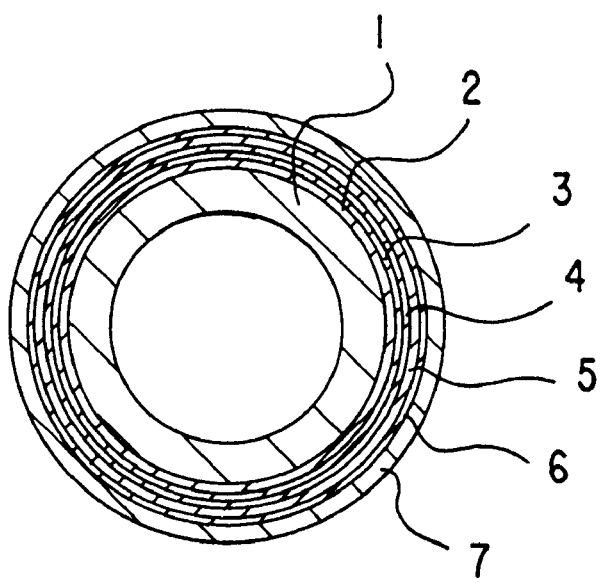
FIG. 8 is a cross-sectional view of a conventional steel pipe for comparison.

The examples of the present invention will be described with reference to the accompanying drawings. In FIGS. 1 to 8, the reference numerals 1 to 5 denote stainless steel pipe, epoxy resin adhesive, fluoroplastic layer, polyamide or polyolefin resin layer, and polyamide adhesive layer, respectively.

Example 1

1) Metal pipe: A single-spirally wound stainless steel pipe (1) of SUS304, 8 mm in outer diameter and 0.3 mm in wall thickness, was prepared.

2) Polyamide resin layer: A polyamide resin layer (4), 1000 μm thick, was formed by extrusion coating from nylon 12, on a fluoroplastic layer (3).

3) Impact resistance test: The specimen was tested for impact resistance according to the DuPont test method. The results are shown in Table 1.

Example 2

1) Metal pipe: A dual-spirally wound stainless steel pipe (1) of SUS304, 8 mm in outer diameter and 0.7 mm in wall thickness, was prepared.

2) Epoxy resin layer: An epoxy resin layer (2), 5 mm thick, was formed by dip coating, followed by baking at 300° C. for 60 seconds, from bisphenol-type epoxy resin.

3) Polyolefin resin layer: A polyolefin resin layer (4), 800 μm thick, was formed by extrusion coating from high-density polyethylene, on a polyamide adhesive layer (5)

4) Impact resistance test: Carried out in the same manner as in Example 1. The results are shown in Table 1.

Example 3

1) Metal pipe (1): The same one as in Example 1 was used.

2) Polyamide resin adhesive layer: A polyamide resin adhesive layer (5), 100 μm thick, was formed by extrusion coating from nylon 12.

3) Polyamide resin layer (4): The same one as in Example 1.

4) Impact resistance test: Carried out in the same manner as in Example 1. The results are shown in Table 1.

Example 4

1) Metal pipe (1): The same one as in Example 1 was used.

2) Epoxy resin layer (2): The same one as in Example 2.

3) Fluoroplastic layer: A fluoroplastic layer (3) was formed on the epoxy resin layer (2) by dip-coating from a solution of polyvinyl fluoride in diethylene phthalate, followed by baking at 350° C. for 60 seconds.

4) Polyamide resin layer (4): The same one as in Example 1.

5) Impact resistance test: Carried out in the same manner as in Example 1. The results are shown in Table 1.

Example 5

1) Metal pipe (1): The same one as in Example 2 was used.

2) Epoxy resin layer (2); The same one as in Example 4.

3) Fluoroplastic layer (3): The same one as in Example 4.

4) Polyolefin resin layer (4): The same one as in Example 2.

5) Impact resistance test: Carried out in the same manner as in Example 1. The results are shown in Table 1.

Example 6.

1) Metal pipe (1): The same one as in Example 2 was used.

2) Polyamide resin adhesive layer (2): The same one as in Example 4.

3) Fluoroplastic layer (3): The same one as in Example 4.

4) Polyamide resin adhesive layer (5): The same one as in Example 3.

5) Polyolefin resin layer (4): The same one as in Example 2.

6) Impact resistance test: Carried out in the same manner as in Example 1. The results are shown in Table 1.

Example 7

1) Metal pipe (1): The same one as in Example 2 was used.

2) Epoxy resin layer (2): The same one as in Example 4.

3) Fluoroplastic layer (3): The same one as in Example 4.

4) Polyamide resin adhesive layer (4): The same one as in Example 3.

5) Polyamide resin layer (5): A polyamide resin layer (5), 800 μm thick, was formed by shower coating from nylon 12.

Comparative Example

A dual-spirally wound pipe (1) was prepared in the sane manner as in Example 2, On this pipe was formed an electroplated zinc layer (2) by ordinary electroplating. Then, a chromate layer (3) was formed from a chromating solution containing 5–20 g/L of chromium (VI) compound. Then, a primer layer (4) was formed by spray coating. Further, a fluoroplastic layer (5) was formed in the same manner as in Examples. Finally, a polyamide layer (6) was formed from nylon 12. The coated pipe was covered with a heat-shrinkable polyvinyl chloride tube (7). The resulting specimen was tested for impact resistance in the same manner as in Example 1. The results are shown in Table 1.

TABLE 1

| Example 1 | Good, no cracking nor peeling. |
| Example 2 | Good, no cracking nor peeling. |
| Example 3 | Good, no cracking nor peeling. |
| Example 4 | Good, no cracking nor peeling. |
| Example 5 | Good, no cracking nor peeling. |
| Example 6 | Good, no cracking nor peeling. |
| Example 7 | Good, no cracking nor peeling. |
| Comparative Example | Poor, with cracking. |

As mentioned above, the coating structure of the present invention consists of a polyamide or polyolefin resin layer formed directly or indirectly on the outer surface a stainless steel pipe, so that the resin layer ensures adhesion and absorbs shocks due to splashed pebbles. In a modified embodiment, a flexible fluoroplastic intermediate layer is formed so as to improve the layer-to-layer adhesion and the shock absorbing performance. Thus, the resin coating structure of the present invention exhibits good resistance to corrosion with mud and chipping by splashed pebbles.

What is claimed is:

1. A corrosion- and chipping-resistant resin coating structure comprising a stainless steel pipe having a resin layer consisting of a polyolefin or polyamide resin layer directly formed on the outer surface of said pipe.

2. A resin coating structure as defined in claim 1, wherein the polyamide resin layer is 600–1200 μm thick and is formed from nylon 6, nylon 11, or nylon 12.

3. A resin coating structure as defined in claim 1, wherein the polyolefin resin layer is 600–1200 μm thick and is formed from polyethylene, polypropylene, or EVA.

4. A corrosion- and chipping-resistant resin coating structure comprising a stainless steel pipe having a 5 μm thick underlying adhesive layer of epoxy resin directly formed on the outer surface of said pipe and a 800 μm thick polyolefin or polyamide resin layer directly formed on top of the underlying adhesive layer.

5. A resin coating structure as defined in claim 4, wherein the polyamide resin layer is 600–1200 μm thick and is formed from nylon 6, nylon 11, or nylon 12.

6. A resin coating structure as defined in claim 4, wherein the polyolefin resin layer is formed from polyethylene, polypropylene, or EVA.

7. A resin coating structure as defined in claim 4, wherein the epoxy resin layer is formed from an epoxy resin of bisphenol, dihydroxyphenol type, or novolak.

8. A corrosion- and chipping-resistant resin coating structure comprising a stainless steel pipe having only two resin layers, consisting of an underlying adhesive layer of polyamide resin directly formed on the outer surface of said pipe and a polyolefin or outer surface polyamide resin layer directly formed on top of the underlying adhesive layer.

9. A resin coating structure as defined in claim 8, wherein the outer surface polyamide resin layer is 600–1200 μm thick and is formed from nylon 6, nylon 11, or nylon 12.

10. A resin coating structure as defined in claim 8, wherein the polyolefin resin layer is 600–1200 μm thick and is formed from polyethylene, polypropylene, or EVA.

11. A resin coating structure as defined in claim 8, wherein the underlying adhesive polyamide resin layer is 10–300 μm thick and is formed from any one of nylon 6, nylon 11, and nylon 12 which has a high bond strength and a low melting point.

* * * * *